INVENTOR
Joseph Giuffrida
BY: George W. Crawley
ATTORNEY

Jan. 19, 1960 J. GIUFFRIDA 2,922,059

AMPLIFIER TUBE

Filed Oct. 14, 1955 2 Sheets-Sheet 2

INVENTOR.
Joseph Giuffrida
BY George W. Crowley
ATTORNEY

United States Patent Office 2,922,059

Patented Jan. 19, 1960

2,922,059

AMPLIFIER TUBE

Joseph Giuffrida, Peabody, Mass., assignor to Columbia Broadcasting System, Inc., a corporation of New York, doing business under the name of CBS-Hytron, a division of Columbia Broadcasting System, Inc., Danvers, Mass.

Application October 14, 1955, Serial No. 540,380

4 Claims. (Cl. 313—3)

The invention relates to the electronic art in general and to electron tubes in particular.

The term parasitic oscillation is commonly used to describe undesirable oscillations which occur in oscillators or power amplifiers. The effect of parasitic oscillations is, almost without exception, deleterious to the proper operation of any circuit. At the very least, distortion of desired waveform results when parasitic oscillations of comparatively low amplitude are present; high amplitudes are even worse since physical damage to circuit components may also result.

Many methods have been devised to reduce or eliminate parasitic oscillations in various circuits. For example, well-known plate neutralizing circuitry has been devised to minimize the tendency of power amplifiers to oscillate at their natural frequency. The use of radio frequency chokes and the proper selection and placement of lead-in wires have, on occasion, eliminated parasitic oscillations.

Experience has shown that each particular method of compensation has its advantages and its disadvantages. However, an examination of each known method of compensation reveals that a common disadvantage exists; namely, the fact that, for best operation, provision must be made for adjustment of the compensating means. Adjustment is necessary in practice because differences exist between seemingly identical circuits. The differences derive mainly from the small differences in characteristics of practical tubes or components. The necessity of using adjustable compensating means introduces the possibility of error due to misadjustment and complicates the circuitry involved without improving the operation of the device commensurately.

In so far as vacuum tubes are concerned, no sure method of preventing parasitic oscillations has been devised. Some attempts have been madt to provide tubes which are not prone to oscillations of a parasitic nature in particular applications. In general, special tests are made on the regular run of tubes in production to select those which happen to be relatively free from parasitic oscillations. Such a procedure is, of course, wasteful and time-consuming. Furthermore, freedom from parasitic oscillations may not, regardless of the rigidity of such tests, be guaranteed. Design parameters, such as the spacing of the elements within the tube envelope, have also been changed to minimize parasitics. However, such changes also change other desirable tube characteristics. As a matter of fact, desirable characteristics may be changed to such a degree that the tube is no particular value except for applications in which freedom from parasitic oscillations is of primary importance. Such a procedure again is wasteful and time-consuming.

Parasitic oscillations are particularly annoying when encountered in the horizontal drive circuits of television receivers. Unfortunately, conditions are conducive to oscillations in popular horizontal drive circuits, which have an autotransformer, usually called a fly-back transformer, and two-way electronic switches incorporated therein. The autotransformer must pass the deflection waveform without distortion and also supply high voltage pulses during the retrace time to maintain the high voltage supply at rated voltage. The former requirements fix the parameters of the autotransformer so that a high Q is required while the latter requirements prevent connection of damping means across the entire autotransformer. As a result, shock-excited oscillations are possible during the retrace time. Even though such oscillations are rapidly damped during the time the deflection waveform is being passed, the presence of the oscillations is sometimes evident on the viewing screen as the so-called Barkhausen lines.

Even if oscillations do not originate in the autotransformer, a low anode voltage on the drive tube gives rise to the same effect. When the voltage on the anode of a beam tetrode, such as that used commonly as the drive tube in television receivers, is lower than the potential on the screen of the tube, Barkhausen oscillations may occur. The frequency and amplitude of these oscillations may be calculated by well-known methods. In any event, whether the oscillations arise in the autotransformer or the tube, Barkhausen oscillations are equally deleterious to the proper operation of the circuit.

Therefore, it is an object of this invention to provide a damping means which does not require adjustment in an electronic circuit.

Another object of this invention is to provide an improved tube which is substantially incapable of sustaining oscillations.

It is still another object of this invention to provide a tube which improves operation of television receiver sweep circuits.

A still further object of this invention is to provide a tube which retains desired characteristics but is substantially incapable of sustaining oscillations.

In general, the present invention consists in a vacuum tube having a plurality of elements including at least two electron-emitting surfaces or cathodes, two anodes and one or more grids and means for connecting each of the aforesaid elements to predetermined portions of an electronic circuit. One cathode, the grids and one anode are shaped and disposed to form a tube of any desired characteristics. The second cathode is formed as an integral part of the first anode lead. It is preferred that the anode lead be oxide coated to increase the efficiency of the second cathode. The plate current flowing in the first anode serves to heat the lead to energize this second cathode. The second anode is mounted adjacent to the second cathode and supported by insulating material on one of the other elements of the tube. A connection from the second anode may then be made to any desired point in an electronic circuit. This arrangement frees the designer from any concern over failure of insulation in a tube when it is desired to have the cathode of one tube at the anode potential of another. For a better understanding of the invention together with other and further objects, features and advantages, reference should be made to the following description which is to be read in connection with the accompanying drawings in which:

Figure 1:
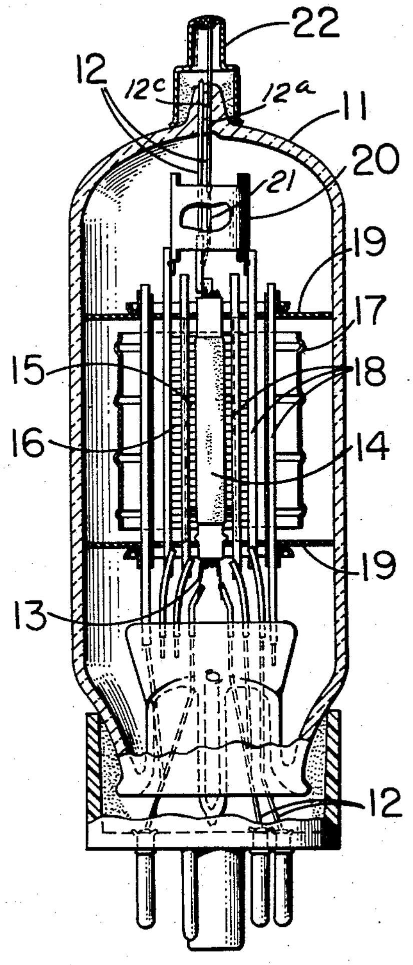
Fig. 1 is a perspective view of a preferred embodiment of this invention, partially cut away, to show the details thereof.

Referring now to Fig. 1, an actual embodiment of the present invention may be clearly seen. An evacuated envelope 11 encloses the working parts of the invention.

An appropriate number of lead-in wires 12 are sealed into one end of the envelope 11. Another lead-in wire 12a is brought through the other end of the envelope 11 through a cap 22. Such a double ended structure is not essential to the present invention but is a convenient way to attain the objects of the invention as will be clear hereinafter. The elements shown in the lower portion of Fig. 1 in the particular embodiment illustrated are a filament 13, a cathode 14, a control grid 15, a screen grid 16, and an anode 17. It should be noted, in passing, that the filament 13 and the cathode 14 may be replaced with a known filamentary cathode, if desired. Appropriate spacing and supporting rods 18 and insulators 19 are shown. The upper end of the supporting rod 18 which cooperates with the screen grid 16 is extended to support a second anode 20. The second anode 20 is thus supported in place around the lead-in wire 12a which is connected to the first anode 17. The same lead-in wire 12a has a portion 21 thereof covered with an electron emissive substance, such as an alkaline earth carbonate, to form a second cathode. An electrical contact between the second anode 20 and the screen grid 16 is shown but need not be made. As a matter of fact, greater flexibility in operation may be obtained by electrically insulating the second anode 20 from all other elements in the tube including the screen grid 16, thereby allowing connection of the second anode 20 to any desired point.

Figure 1A:
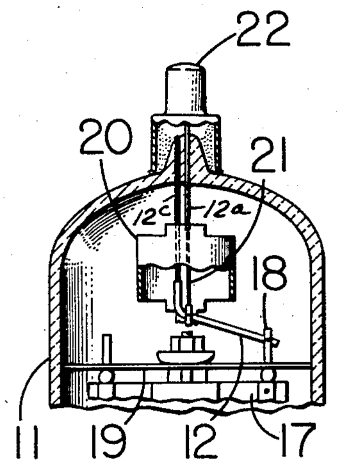
Fig. 1A is an enlarged view of the upper portion of the tube shown in Fig. 1 to show more clearly how the parts are disposed.

Fig. 1A more clearly shows the actual arrangement of the parts in an operative tube. Wherein another lead-in wire 12c is brought out through the top end of envelope 11. The advantage of such an arrangement is evident to those skilled in the art. During fabrication it is desirable to age the tetrode section of the tube by operating the tube with relatively high anode currents. To avoid the possibility of damage to the filament of the diode section, such currents are carried by the lead-in wire 12 which ends at the outer surface of the envelope 11. Such construction is preferred for the advantages outlined but is not essential to the realization of the primary objects of the invention.

The operation of the illustrated embodiment is relatively simple. After connection of the tube into a circuit, it will be observed that current flows to the first anode 17 of the tube. By properly selecting the material and size of the lead-in wire 12a attached to the anode 17 more clearly shown in Fig. 1A, a considerable amount of heat may be generated in the lead-in wire 12a. This heat, in turn, overcomes the work function of the emissive material forming the second cathode 21 so that an electron cloud appear around the filamentary cathode 21. In the embodiment shown, wherein the second anode 20 is directly connected to the screen grid 16, the electrons emitted from the second cathode 21 are subjected to diode action; i.e. they are attracted to the second anode 20 when the potential there tends to become more positive than that of the second cathode 21 and repelled therefrom when the voltage relationship between the two is reversed. Hence, the potential of the second anode 20 may never become very much more positive than that of the second cathode 21. As a matter of fact, the potential of the second cathode 21 and the second anode 20 may be considered to be the same in almost every practical case even under conditions which would normally raise the potential of the second anode 20 above the potential of the second cathode 21. This, in turn, prevents the tube from acting as a Dynatron so that oscillation is impossible.

Figure 2:
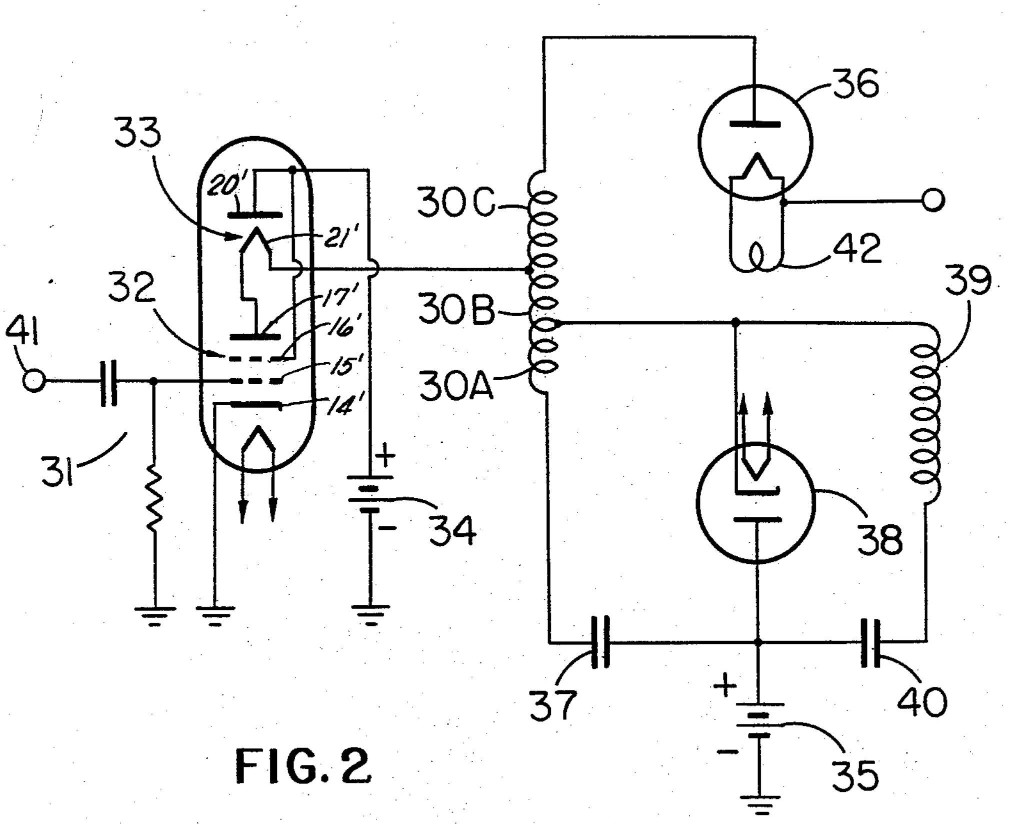
Fig. 2 is a schematic diagram of a tube, as shown in Fig. 1, in an operative circuit in which it has been used.

The effects of such operation are illustrated in Fig. 2. Only those portions of a typical horizontal drive circuit which are of interest to the present invention are shown in Fig. 2 and portions of the illustrated circuit have been simplified. A signal, consisting of a sawtooth voltage of predetermined amplitude and duration and a negative pulse of predetermined amplitude may be generated and connected to an input terminal 41. This signal is coupled to the control grid 15' of the driver tube 32 through a coupling circuit 31. The driver tube 32 may contain a beam tetrode of standard design as shown. The cathode 14' of the driver tube 32 is shown returned directly to ground for convenience although other circuits for cathode bias may be used equally well. The screen grid 16' of the driver tube 32 is held at a fixed positive bias with respect to the cathode 14' by connecting a voltage source 34 as shown, although other methods of obtaining screen bias may be used. The screen grid 16' is also connected to the anode 20' of a diode 33. This anode corresponds to the second anode 20 in Fig. 1. The anode 17' of the driver tube 32 is connected to one side of the filament 21' of the diode 33. This filament corresponds to the second cathode 21 of Fig. 1. The second side of the filament 21' is connected to a rectifier 36 through a portion of an autotransformer, or inductance 30c. The filament of rectifier 36 is energized through a transformer 42, the secondary winding of which only is shown. Such an arrangement of a rectifier is well known in the art and is used to provide an accelerating voltage in the viewing tube. The cathode of a damper tube 38 is connected to the junction between portions 30b and 30a of the autotransformer as shown. At the same point, a connection is made to one end of the horizontal deflection coils 39 of the cathode ray tube (not shown). The second end of the inductance 30a and the deflection coil 39 are connected to the anode of the damper tube 38 through capacitors 37 and 40, respectively. The anode of the damper tube 38 is also connected directly to a potential source 35 as shown. Filament voltage is supplied to the damper tube 38 as shown. Inductances 30a, 30b and 30c are not, in practice, separate, but are usually portions of an autotransformer. Moreover, the deflection coil 39 is usually made up of two coils serially connected and so disposed that their electro-magnetic fields aid each other.

Thus, the driver tube 32 and the damper tube 38 are, in effect, electronic switches and the inductances 30a, 30b and 30c may each be considered to be a tuned circuit if stray capacitance and tube capacitances are considered. It is evident, moreover, that the damper tube 38 and the rectifier tube 36 are so connected across inductances 30a and 30c, respectively, that any shock-excited oscillation in either portion of the autotransformer would be quickly damped. It is equally evident that diode 33 alone offers a load to the driver tube 32 for the duration of the negative pulse mentioned heretofore. The diode 33 will continue to conduct, and, therefore, load the inductance 30b, as long as the anode voltage on the driver tube 32 is below the screen voltage thereof. The net result is that oscillations of the inductance 30b caused by any component of the negative pulse are immediately damped out.

Similar results could be obtained if it were possible to replace diode 33 with a tube such as the damper tube 38 wherein the cathode is insulated from the filament. Such an expedient is subject to so many difficulties that it is not practical. The size of a damper tube alone is sufficient reason for not using such a tube. Moreover, extreme care must be taken to insulate the filament and cathode of such a tube so that high voltage breakdown will not occur. Breakdown will, of course, prevent proper operation and, even more important, will probably destroy other circuit components. The circuit of the invention is not subject to any of the enumerated difficulties. Moreover, protection of the diode is easily incorporated by using a fuse of appropriate size.

While the foregoing description outlines a preferred embodiment of the invention, modifications will suggest themselves to those skilled in the art. Such modifications as providing a heavy auxiliary lead from the anode of the tetrode section through the envelope to allow aging of the tetrode section without danger to the diode section or insulating the second anode from the screen grid to permit connection of the second anode to other points in a circuit than the screen grid are obvious modifications which extend the usefulness without departing from the principles of the invention. Further, the concept of using current through a tube section element or its lead-in as the filament current for a second tube section is believed to be novel and adaptable to many tube types and applications. Therefore, the invention should not be restricted to the embodiment shown, but only by the spirit and scope of the appended claims.

The invention claimed is:

1. In the horizontal drive circuit for a television receiver, an electronic tube comprising, the combination of a beam tetrode and a diode, the filament of said diode being coextensive with a predetermined portion of the anode circuit of said tetrode and adapted to be energized by the anode current therein, and the anode of said diode being disposed on outwardly extending supports affixed and electrically connected to the screen grid in said tetrode to coact with said filament whereby the anode potential on said tetrode is constrained from falling substantially below the screen potential in said tetrode.

2. An amplifier tube incapable of sustaining oscillations comprising, an evacuated envelope, a first and second filament, a first and second anode, a cathode, a control grid and a screen grid disposed within said envelope, said first filament, said cathode, said control grid, said screen grid and said first anode forming a beam tetrode section, said second filament and said second anode forming a diode section, said second filament being serially connected to said first anode and energized by the current thereto and means connecting said second anode to said green grid whereby said diode section constrains the potential on said first anode from falling substantially below the potential on said screen grid.

3. An electron discharge tube comprising a tetrode section having at least a screen grid, a first anode and a lead-in wire connected to said first anode, and a diode section having a filamentary cathode and a second anode, said filamentary cathode being coextensive with a predetermined portion of said lead-in wire and energized by the current therein, said second anode being disposed around said filamentary cathode and electrically connected to said screen grid.

4. An electron discharge tube including, a first and a second filament, a control grid, a screen grid, a first and a second anode and a plurality of lead-in wires, a separate one of said plurality of lead-in wires being connected to each of the enumerated electrodes, said first filament, said control grid, said screen grid and said first anode forming a tetrode section, said second filament being coextensive with a predetermined portion of said lead-in wire to said first anode, said second anode being disposed around said second filament and supported by electrically conductive extensions integral with said screen grid whereby the voltage on said screen grid is maintained at a voltage equal to or lower than the voltage on said first anode.

References Cited in the file of this patent

UNITED STATES PATENTS

| | | |
|---|---|---|
| 1,419,547 | Ehret | June 13, 1922 |
| 1,645,280 | Goldsborough et al. | Oct. 11, 1927 |
| 1,695,966 | Little et al. | Dec. 18, 1928 |
| 1,878,124 | Foster | Sept. 20, 1932 |
| 2,048,023 | Parker | July 21, 1936 |
| 2,097,258 | Sev | Oct. 26, 1937 |
| 2,149,080 | Wolff | Feb. 28, 1939 |
| 2,721,951 | Cohen et al. | Oct. 25, 1955 |